(12) United States Patent
Ullmann et al.

(10) Patent No.: US 6,970,907 B1
(45) Date of Patent: Nov. 29, 2005

(54) METHOD AND SYSTEM FOR E-MAIL CHAIN GROUP DISCUSSIONS

(75) Inventors: Lorin Evan Ullmann, Austin, TX (US); Joseph Kubik, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 774 days.

(21) Appl. No.: 09/714,756

(22) Filed: Nov. 16, 2000

(51) Int. Cl.[7] .............................................. G06F 15/16
(52) U.S. Cl. ....................... 709/206; 715/758; 715/759
(58) Field of Search ............................... 709/206, 217, 709/220, 246; 715/758, 759

(56) References Cited

U.S. PATENT DOCUMENTS

| | | | | |
|---|---|---|---|---|
| 5,125,075 | A | | 6/1992 | Goodale et al. ............ 395/200 |
| 5,659,746 | A | | 8/1997 | Bankert et al. ............. 395/621 |
| 5,765,033 | A | | 6/1998 | Miloslavsky ........... 395/200.36 |
| 5,767,847 | A | | 6/1998 | Mori et al. .................. 345/329 |
| 6,078,921 | A | * | 6/2000 | Kelley .......................... 707/10 |
| 6,185,551 | B1 | * | 2/2001 | Birrell et al. ................... 707/3 |
| 6,330,589 | B1 | * | 12/2001 | Kennedy .................... 709/206 |
| 6,434,601 | B1 | * | 8/2002 | Rollins ....................... 709/206 |
| 6,496,853 | B1 | * | 12/2002 | Klein ......................... 709/206 |
| 6,549,957 | B1 | * | 4/2003 | Hanson et al. ................. 710/5 |
| 6,604,132 | B1 | * | 8/2003 | Hitt ............................ 709/206 |
| 6,606,647 | B2 | * | 8/2003 | Shah et al. ................. 709/206 |
| 6,622,147 | B1 | * | 9/2003 | Smiga et al. ............... 707/102 |
| 6,633,630 | B1 | * | 10/2003 | Owens et al. ............ 379/93.24 |
| 6,772,216 | B1 | * | 8/2004 | Ankireddipally et al. ... 709/230 |

OTHER PUBLICATIONS

Conversion-Based Mail by Douglas E. Comer and Larry L. Peterson, Nov. 1986, ACM Transactions.*

* cited by examiner

Primary Examiner—John Follansbee
Assistant Examiner—M A. Siddiqi
(74) Attorney, Agent, or Firm—Robert H. Frantz; David A. Mims, Jr.

(57) ABSTRACT

A system and method for reformatting chain forwarded and chain replied electronic messages into thread-of-discussion messages for improved readability and reader comprehension. The chained electronic messages are parsed into discussion entries which are then sorted by a preferred order, such as last-to-first by date of creation. Extraneous fields and data which are not part of the substantive discussion are removed from the discussion entries. Long or full electronic mail addresses are replaced by abbreviations or preferred nicknames which may be found in an address book. Finally, the sorted discussion entries with source abbreviations or preferred nicknames are combined and output as a thread-of-discussion format message.

27 Claims, 5 Drawing Sheets

*Prior Art*

*Prior Art*

METHOD AND SYSTEM FOR E-MAIL CHAIN GROUP DISCUSSIONS

CROSS-REFERENCE TO RELATED APPLICATIONS CLAIMING BENEFIT UNDER 35 U.S.C. 120

This application is related to the U.S. applications Ser. No. 09/672,181 filed on Sep. 28, 2000 by Lorin Evan Ullmann, et al, and Ser. No. 09/714,759 filed on Nov. 16, 2000 by Lorin Evan Ullmann, (to be amended to include serial numbers when they have been assigned), both of which are all commonly assigned.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

The related applications Ser. Nos. 09/672,181 and 09/714,759 are incorporated herein by reference in their entireties including drawings, and are hereby made a part of this application.

BACKGROUND OF THE INVENTION

1. Field of the Invention

This invention pertains to the arts of electronic message and e-mail transmission and reception, and especially to the art of chain-forwarded message groups and discussions within those groups.

2. Description of the Related Art

Electronic mail and electronic messaging have become key and integral to everyday life, both in personal lives and business lives, for millions of users worldwide. The speed and accuracy with which electronic messages and e-mails are delivered is unrivaled by other forms of messaging, such as paper mail, overnight express mail, facsimile, and voice messaging.

Prior to the widespread proliferation of the Internet and Internet-based e-mail, there were many proprietary formats of electronic messaging systems, such as IBM's Lotus Notes system, Novel's DaVinci system, and others.

However, due to global acceptance and adoption of the Internet, the Internet's e-mail protocol has become the most common electronic messaging protocol in use today. The Simple Mail Transfer Protocol ("SMTP") provides for a quick, error-free and robust method for transferring electronic messages from one e-mail server to another. SMTP is primarily based upon two standards proliferated by the Internet Architecture Board ("IAB"), specifically RFC-821 "Simple Mail Transfer Protocol" and RFC-822 "Standard for the format of ARPA Internet text messages". These standards and protocols are well-known in the art. RFC-821 describes the protocol used for transferring electronic messages from one server to another, and RFC-822 describes a corresponding format for those electronic messages.

Figure 1:
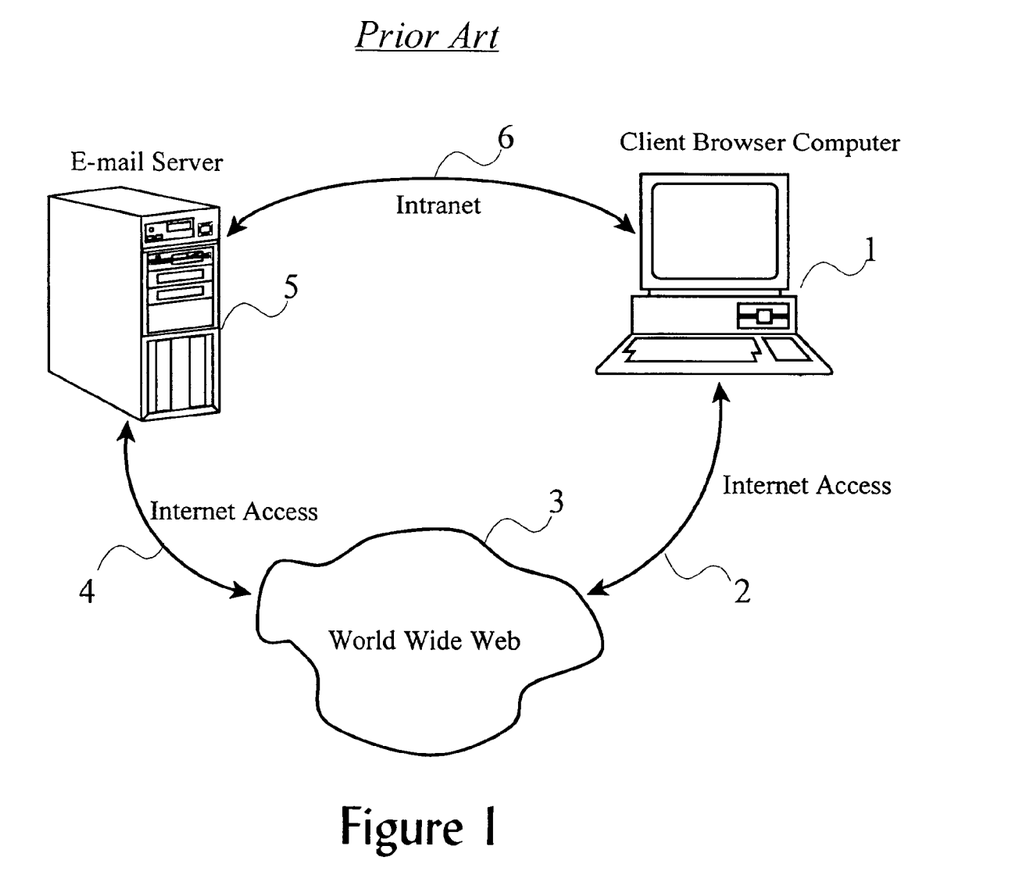
FIG. 1 shows the common arrangement of e-mail servers, client computers, and computer networks.

Turning to FIG. 1, the basic arrangement of client browser computer or client e-mail computers and web servers is shown. A client computer (1) may access a web-based e-mail server (5) via any computer network, such as the World Wide Web (3), or an Intranet (6) such as a LAN or WAN. This access may be made through a modem and a dial-up Internet Service Provider ("ISP"), or through a "dedicated" direct connection to the Internet. The client computer (1) is normally equipped with an e-mail composer and reader program, such as Quailcomm's Eudora, Netscape's Messenger, or Microsoft's Outlook programs. These and many other widely available programs are compliant with the SMTP standards, and interoperate with e-mail servers over computer networks such as the World Wide Web.

Figure 2:
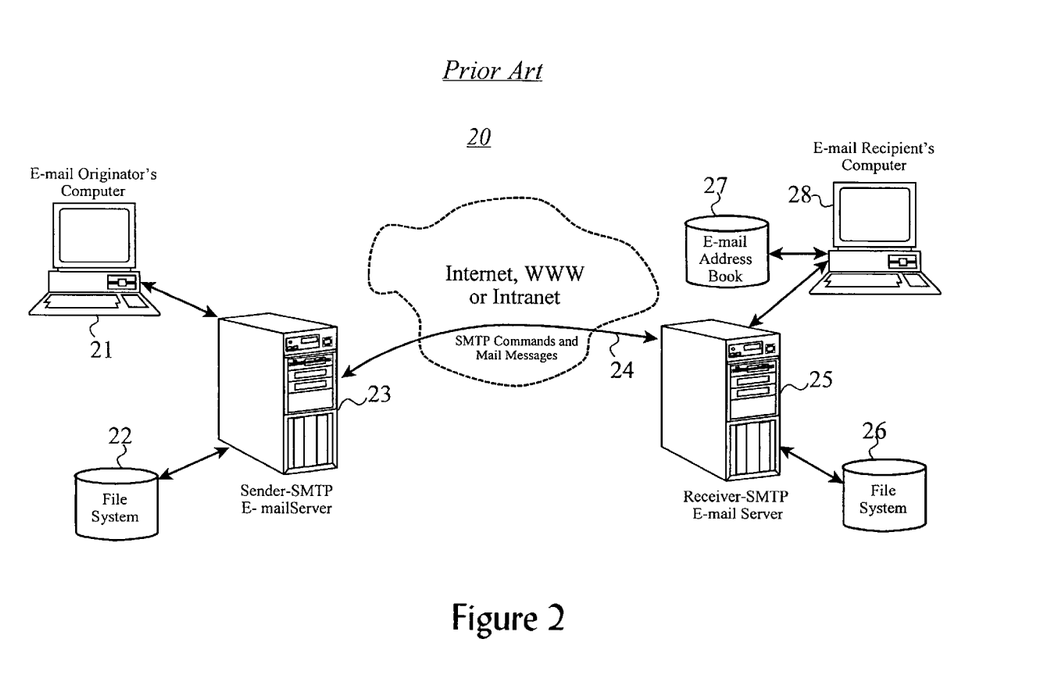
FIG. 2 shows the fundamental arrangement of e-mail sender and receiver servers.

Turning to FIG. 2, the arrangement (20) as defined by the RFC's of a sender server (23) and a receiver server (25) using the SMTP protocol is shown. A user (21) may author a SMTP-compliant message and send that message to an e-mail sender server (23). Using a series of SMTP commands (24) which are communicated to a receiver SMTP server (25) via a computer network, the electronic message is transferred from the sender SMTP (23) to the receiver SMTP server (25).

The receiver SMTP (25) server typically stores the received electronic message within its file system (26) for later retrieval by the intended recipient. The addressing and routing scheme used by e-mail servers to transmit and route electronic messages to each other using of this protocol are well-known within the art, and are also defined in the public RFC documents of the IAB.

Eventually, the recipient uses his computer (28) to download the messages from the receiver server (25), and to read, reply, or forward the messages. His computer (28) is usually equipped with e-mail reading and authoring software, which may include an e-mail address book (27).

The generalized message format of an electronic message is shown in Table 1. An electronic message is typically divided into two portions, a header and a body. Within the header are multiple tags or fields which indicate the source and destination of the message and other useful information.

TABLE 1

Generalized Electronic Message Format

Received: from source by local_server; time_of_day
From: senders_name <senders_email_address>
Reply-to: <senders_email_address>
To: recipients_name <recipients_email_address>
Subject: text_of_the_subject_line
Content-type: type_of_content_such_as_MIME
Text of the actual message In the example generalized message format shown in Table 1, there is a "Received" header field, a "From" header field, a "Reply-To" field, and a "To" field. These are also followed by a "Subject" field and then finally by the text of the actual message. These fields are generated by the e-mail composer on the originator's computer, and they are used by the various e-mail servers within the computer network to route the messages to the correct recipient.

As shown in Table 1, the "Received:" message header field shows information regarding which server received the message and at what time of day it was received by the local server. The "From" field in the message header shows the originator's or the sender's name and address. The "Reply-To" field shows the sender's e-mail address for use in replying to the sender. The "To" field shows the intended recipient's name and/or recipient's e-mail address. And, the "Subject" field shows a text string to be displayed when the e-mail is viewed among other e-mails in a mail box.

Most e-mail composer and reader programs allow messages to be forwarded to second, third, and subsequent recipients. For example, a sender may author an original message and send it to a first recipient. The first recipient may read that message, append comments to it and forward it to a second recipient. Table 2 shows a generalized message format for forwarded electronic messages which uses using a method of forwarding called "inline content".

TABLE 2

Generalized Forwarded Electronic Message Format
using Inline Type of Forwarding

Received: from source by local_server; time_of_day
From: first_recipients_name <first_recipients_email_address>
Reply-to: <first_recipients_email_address>
To: second_recipients_name <second_recipients_email_address>
Subject: FWD:text_of_the_subject_line_written_by_the_originator
Content-type: type_of_content_such_as_MIME
Content-disposition: inline
Text of the message written by the first recipient intended for the second recipient
Boundary_tag
Received: from source by local_server; time_of_day
From: originator_name <originators_email_address>
Reply-to: <originators_email_address>
To: first_recipients_name <first_recipients_email_address>
Subject: FWD:text_of_the_subject_line_written_by_the_originator
Content-type: type_of_content_such_as_MIME
Text of the actual message written by the originator and intended for the first recipient
Boundary_tag This forwarded message format resembles the generalized message format of Table 1, especially in the initial message header, including the "received" field, "from", "reply-to", "to", and "subject" fields. However, most programs modify the text contained in the "subject" field to include an indication that this is a forwarded message, such as appending the letters "FWD" prior to the actual text of the originator's subject line. Following this message header, the text of the comments authored by the first recipient and intended for the second recipient are given. Then, according to the inline forwarding method, a boundary tag is given which indicates the beginning of the actual forwarded message. Following the first boundary tag, another set of message header fields are shown which are the message header fields from the original message from the original sender of the message. These message fields are then followed by the text of the original message from the originator, and is concluded by a closing boundary tag.

Another method for forwarding an electronic message to another recipient is by "attaching" the original message to the new message. The SMTP protocol allows for files of all types to be "attached" to an electronic message, and as such, one method for forwarding a message is to create a new message to the next recipient, and to attach the old message to this new message.

As shown in Table 3, the general format of a forwarded message as an attachment is seen.

TABLE 3

Generalized Forwarded Electronic Message Format
using Attachment Type of Forwarding Received: from source by local_server; time_of_day
From: first_recipients_name <first_recipients_email_address>
Reply-to: <first_recipients_email_address>
To: second_recipients_name <second_recipients_email_address>
Subject: FWD:text_of_the_subject_line_written_by_the_originator TABLE 3-continued Generalized Forwarded Electronic Message Format
using Attachment Type of Forwarding Content-type: type_of_content_such_as_MIME
Content-disposition: inline
Text of the message written by the first recipient intended for the second recipient
Start-of-attachment-tag
    Received: from source by local_server; time_of_day
    From: originator_name <originators_email_address>
    Reply-to: <originators_email_address>
    To: first_recipients_name <first_recipients_email_address>
    Subject: FWD:text_of_the_subject_line_written_by_the_originator
    Content-type: type_of_content_such_as_MIME
    Text of the actual message written by the originator and intended for the first recipient
End-of-attachment-tag This message begins similar to the message in Table 2 in that it is preceded by a new message header containing multiple header fields, including the "received", "from", "reply-to", "to", "subject" fields. However, in this case following the text of the comments written by the first recipient for the second recipient, there are special tags to indicate that there is attached file rather than the inline copy of the forwarded file. This may be the same type of tag that may be used to attach a data file or other type of file to the electronic message, but in this case the attached file is simply a text file which is actually the original message from the originator.

Thus, if one looks within that attached file, one will see that there is the original set of message header tags which indicate the originator's name, the first recipient's name (or the previous recipient's name) and other useful information regarding the previous message.

A subsequent recipient may choose to forward the message to another recipient, thereby forming a chain-forwarded message which may have the original message forwarded through a combination of methods.

All of these message header fields are used for various functions of the e-mail reader and e-mail composer software. If a user wants to reply to the sender of a message he may simply click or select a "reply" function in response to which the composer will be invoked and will automatically address the message to the address indicated in the "reply-to" field of the message. Also, the user may forward the message quite simply by clicking a "forward" button (or otherwise invoking a forward function), which causes the composer to allow creation of a new messaging containing or attaching the first message, and giving the user the capability to enter the next recipient's address and any comments he or she wishes to include.

Another useful function of common e-mail composers and readers available in the art today is that of an address book. An address book stores names and e-mail addresses of other users who are commonly communicate with the user. Most e-mail composers and readers also include automatic functions for adding a message sender's address and information to an address book.

However, with the inline and attachment methods of forwarding electronic messages, addresses for the previous recipient's and the originator of forwarded messages cannot be easily or automatically added to the address book, other than that of the most immediate previous recipient. Further, they cannot be automatically responded to or forwarded to as they are not currently indicated in the first group of message header fields of the forwarded message.

Thus, a user must resort to attempting to type manually each of the previous recipient's e-mail addresses, if he knows them. For example, if a message is forwarded five times from an originator, the fifth recipient can automatically reply to the fourth recipient using the available automatic functions of current e-mail composers, however, he cannot easily reply to all four previous recipients and originator without manually retyping the addresses of each of those parties. Further, he cannot easily add any of these previous recipients and the originator to his address book, except for the fourth recipient.

A third method of forwarding e-mail messages is by "quoting" the actual message into the text of the new message intended for the next recipient. In this method, none of the previous header fields are forwarded to the next recipient. A simple line of text such as "Previous_recipient wrote:" may be inserted above the quoted text, and the quoted text may be set apart such as using a character such as">" or a blue bar in the left margin.

In this case, it is much more difficult for the recipient of a chain-forwarded message to reply to previous recipients because the information regarding the previous recipient's addresses has been completely stripped from the forwarded message.

The related application disclosed a system and method for automatically determining the previous authors and recipients of chain-forwarded electronic messages. In one of the related applications, a method was described in which the received electronic message is scanned or parsed for existing SMTP fields and for new unique fields which indicate a chain of e-mail addresses to which and from which a chain forwarded message may be have been received or sent. The disclosed method and system also provides a method for easily adding these recipients and authors to a user's electronic mail address book.

In another related application, a system and method were disclosed which allowed the creation of chain groups within the electronic mail address book, and functions to automatically associate messages with chain groups by use of a chain-key field in the message header or footer.

Chained messages are forwarded several times or replied to several times. The method used employed by common SMTP e-mail software programs to display the multiple replies and comments can be somewhat confusing. For example, Table 4 shows one method that common e-mail software uses to display the forwarded text components of a chain-forwarded electronic message. In this example a right arrow or greater than symbol ">" is used to indicate how many previous instances of forwarding or replying levels have occurred for a given portion of the message.

TABLE 4

Example Display of Linearly Chain-forwarded E-Mail Message

From: first_recipients_name <first_recipients_email_address>
To: second_recipients_name <second_recipients_email_address>
Subject: FWD:text_of_the_subject_line_written_by_the_originator
Here is something I thought you might find interesting from a friend of mine.
>From: originator_name <originators_email_address>
>To: first_recipients_name <first_recipients_email_address>
>Subject: FWD:text_of_the_subject_line_written_by_the_originator
> What do you think of this new information?
>>From: update@online_news_service.com
>>To: originator_name <originators_email_address>
>>Subject: FWD:text_of_the_subject_line_written_by_the_originator TABLE 4-continued Example Display of Linearly Chain-forwarded E-Mail Message >>Shares of company ABC hit all-time high after news of new product
>>release. Company ABC announced that it's new XYZ product would
>>ship by the end of the year, and would be 5 times more efficient that
>>the closest competitor product.

As can be seen from the example given in Table 4, each time a portion of a text message is forwarded to a new recipient, an additional forwarding character is added along the left margin of the text. This example illustrates a simple linear forwarding scheme in which an automatic news service forwarded news to an originator of a message. The originator then forwarded that message to a first recipient, who then forwarded the same message to a second recipient, such that each time the message was forwarded, the current recipient added a comment of his own.

As shown in Table 5, a chain replied and chain forwarded message may become confusing to read in this format, especially if the progression of the messages and replies is not a linear progression. For example, if the message is forwarded to more than one party simultaneously, and then it is replied to by more than one party, it may become difficult to determine at what time certain replies were made and how each reply relates to the original message or messages. Even though this is a very common message format to receive in today's paradigm of electronic messaging, it is very difficult to decipher and interpret by a recipient.

As shown in Table 5, a chain replied and chain forwarded message may become confusing to read in this format. For example, if the message is forwarded to more than one party and then replied to by more than one party it may become difficult to determine at what time certain replies were made and how they relate to the original message or messages. Even though this is a very common message format to receive in today's scenario or today's paradigm of electronic messaging it is very difficult to decipher and interpret by a recipient.

TABLE 5

Example Display of Non-linearly
Chain-forwarded E-Mail Message

From: bob
To: joe
Subject: REPLY: news about ABC's XYZ
I'm not sure I understand who their competitors really are?
> From: sue
> To: joe
> Subject: FWD: REPLY: ABC's XYZ is now available
> Joe, that ought to take all the market share from ABC's biggest
> competitor!! I can't wait to see how this plays out.
>> From: joe
>> To: sue, bob
>> Subject: REPLY: FWD:ABC shares up sharply on new product
>> announcement
>> Shares of company ABC hit all-time high after news of new product
>> release. Company ABC announced that it's new XYZ product would
>> ship by the end of the year, and would be 5 times more efficient that
>> the closest competitor product.
>>> From: sue
>>> To: joe
>>> Subject: lunch conversation
>>> Joe,
>>> I was having lunch with Bob yesterday, and he said you had told him
>>> that you were getting ready to buy a lot of shares in ABC company.
>>> Is that right? I heard that their competitors had captured nearly 100%

TABLE 5-continued

Example Display of Non-linearly
Chain-forwarded E-Mail Message

>>> of the market share last year and ABC company might not survive
>>> the year.
>>> Bye, Sue As shown in Table 5 it becomes indeterminate as to the order and relevance of forwarded text components and replied text components within a chain-forwarded message, especially if it was not linearly forwarded or replied to, as in this example.

Another form of communications based on text transmissions is known as "chat groups." In chat groups, a single window or a pair of windows is displayed in which replies are posted with a simple label or text identifier as to the submitter or creator of the reply. The label may be a simple as a nick name, first name, or login name, but is not usually as long or as complex as a full e-mail address. For example, Table 6 shows a similar conversation held in a chat group.

TABLE 6

Example Discussion in a Chat Group bob: I'm not sure I understand who their competitors really are?
sue: Joe, that ought to take all the market share from ABC's biggest
  competitor!! I can't wait to see how this plays out.
joe: Sue, I heard that shares of company ABC hit all-time high after news
  of new product release. Company ABC announced that it's new XYZ
  product would ship by the end of the year, and would be 5 times
  more efficient that the closest competitor product.
sue: Joe, I was having lunch with Bob yesterday, and he said you had told
  him that you were getting ready to buy a lot of shares in ABC
  company. Is that right? I heard that their competitors had captured
  nearly 100% of the market share last year and ABC company
  might not survive the year.

As shown in Table 6, a participant such as Bob can monitor the entire thread of conversation between Sue and Joe until he has a question or comment to add. A chat group viewer presents the conversation in a linear format even though it may occur or be originated by multiple parties asynchronously. Further, a chat group such as this is typically organized by participant profile, such as "young adults" or "music lovers," or by subject such as "politics" or "health.". From a chat room server, a user may select a particular subject or participant profile in order to join a chat. Some chat room servers allow a participant to print the interactions as they occur, but in general the chats occur on a realtime basis, unlike electronic mail messaging.

Therefore, there exists and need in the art for a system and method to display chain-forwarded e-mail messages, which may be of linear or nonlinear sequence, in a discussion thread format for ease of understanding and interpretation.

BRIEF DESCRIPTION OF THE DRAWINGS

The following detailed description, when taken in conjunction with the figures presented herein, provides a complete description of the invention.

SUMMARY OF THE INVENTION

A system and method for reformatting a chain-forwarded e-mail message, for creating a chain group if needed, for associating that message with a chain group, and for automatically transmitting the reformatted message to some or all of the members of a chain group. The system provides a more readable or decipherable format of a an electronic message in which multiple instances of forwarding and replying are reduced to a thread of discussion format.

DETAILED DESCRIPTION OF THE INVENTION

The method and system of the invention are preferably realized as software extensions, plug-ins, or applets associated with a standard electronic mail composer and reader program. This enhanced electronic composer and reader program is then executed by a standard client computer platform such as an IBM personal computer ("PC"), Apple Macintosh or iMAC, or similar computer.

Figure 3:
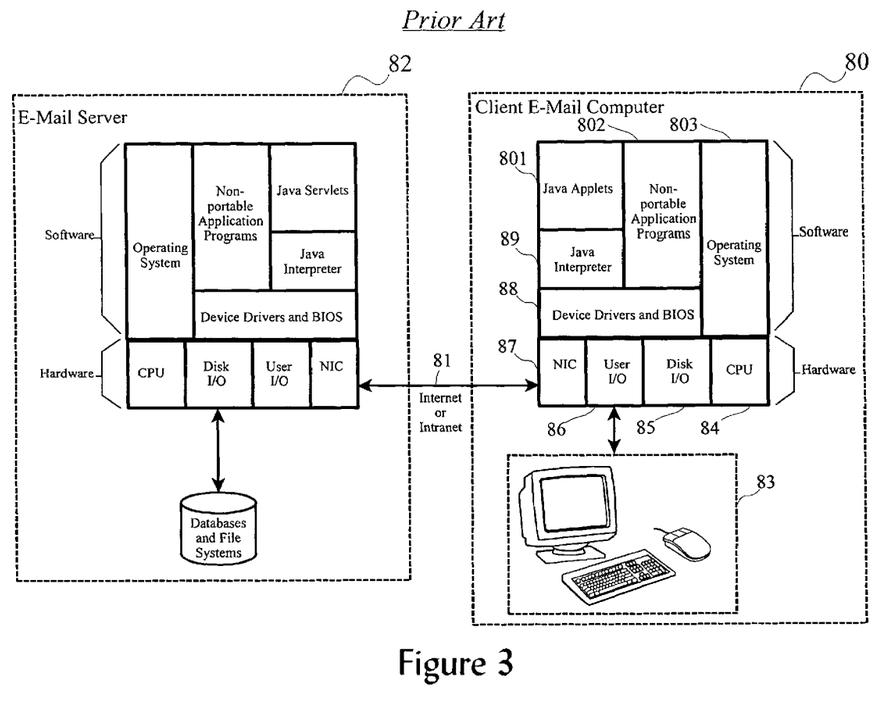
FIG. 3 depicts the basic architecture of e-mail servers and a client computers.

As shown in FIG. 3, the preferred embodiment includes a client computer (80) which has a central processing unit (84), disc input and output (85) for communicating for floppy disks, hard drives, and CD ROM's, user 10 device interfaces (86) such as a display, keyboard, and mouse (83), and a network interface card (87) for interfacing to a computer network such as the Internet or an Intranet (81). The preferred embodiment of the client computer includes device drivers and a bios (88), an operating system such as the Microsoft Windows operating system or IBM OS/2 operating system. The computer platform (80) further comprises non-portable application programs (802) such as the e-mail composer and reader program. The preferred embodiment of the client computer (80) also includes a Java interpreter (89) capable of executing Java applets (801). The e-mail composer and reader such as Netscapes' Messenger program is installed as a non-portable application program (82). The method of the invention may be implemented as changes within the e-mail composer and reader program or as a plug-in modules such as a Netscape Plug-in. Alternatively, it may be implemented as an applet such as a Java applet. The methods for extending such program code, developing a browser plug-in, or an applet is well understood in the art.

The related and incorporated applications describe how to search and identify chain-forwarded e-mail messages for originators and recipients of that message and how to automatically reply to those originators and recipients. The related application further describes how to manage and create chain groups within a user's address book. Some or all of this functionality in the related applications is incorporated into the present invention in its preferred embodiment.

Certain alternative realizations, such as a server-based implementation rather than client-based design, may be made without departing from the spirit and scope of the invention. For example, such a server may reprocess or reformat e-mail messages for client e-mail users. The following description, then, is given in terms of a client-based application and related to a client address book. However, it will be realized by those skilled in the art that such a server-based application is only an alternative embodiment of the invention.

Figure 4:
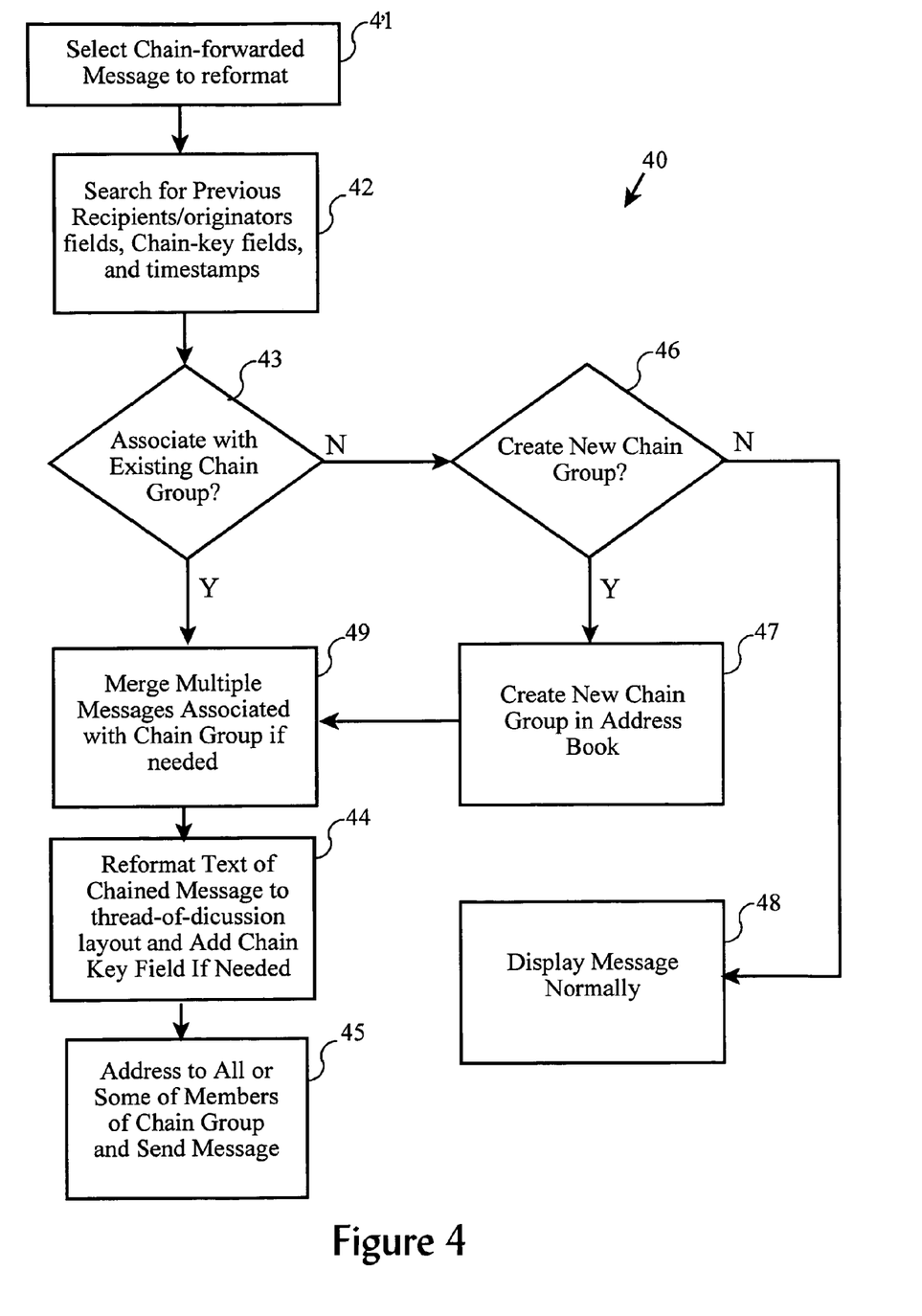
FIG. 4 shows the logical process of the invention for reformatting chain-forwarded e-mail messages into a more readable thread of discussion.

Turning to FIG. 4, the logical process (40) of the invention for merging, reformatting and automatically addressing chain-forwarded messages is shown. First, the user or the system selects (41) a chain-forwarded message to be merged and reformatted. The message is searched (42) for previous recipients and/or originators, for CHAIN_KEY fields, and for any time stamps or previous segments of forwarded text, reply text, and comment text.

The system or the user may decide to associate (43) the message with an existing chain group. If there exists a chain group to associate with the message, the text of the message is optionally merged (49) with other messages associated with the same chain group, and reformatted (44) into a thread of discussion format.

During the reformatting (44) stage, all unnecessary fields for interpreting the thread of discussion are eliminated from the displayed text, such as the FROM, REPLY_TO and SUBJECT fields, and optionally any time stamps. In some embodiments the time stamps may be retained, but in most embodiments the time stamps will be removed. Also, any special texts or markings in the original forwarded text, such as the greater than symbols ">" may be removed in order to provide greater readability.

Preferably, the system also searches an address book for nicknames or first names of recipients and originators. In order to enhance readability of the discussion thread, these nicknames and preferred names are used as simple and short labels for the entries in the discussion thread, rather than using or showing the full e-mail addresses.

If the selected message is not to be associated with an existing chain group or the selected message does not already contain a chain key in it, an option to create or define a new chain group (and chain key) is provided (46, 47).

Figure 5:
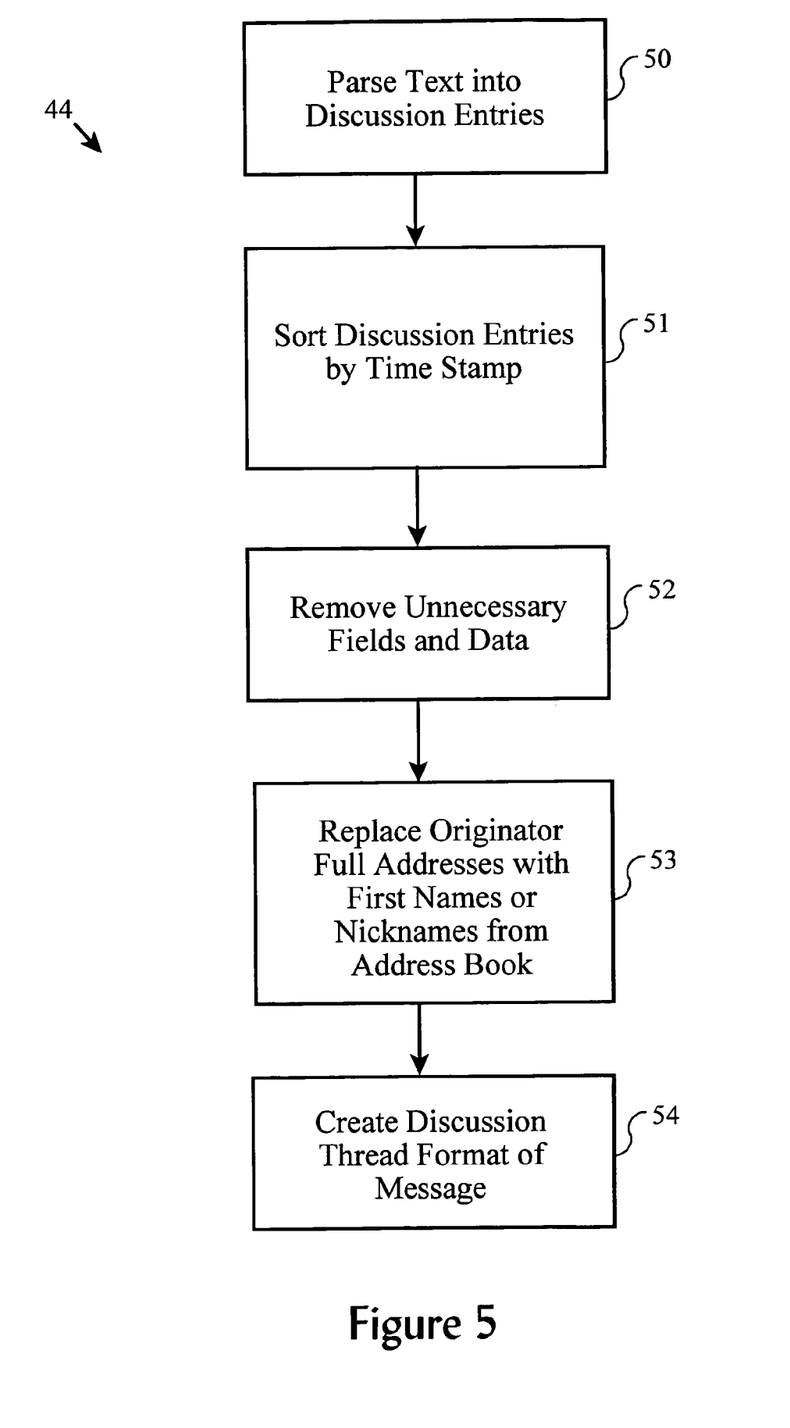
FIG. 5 sets forth details of reformatting chain-forwarded e-mail message text into discussion thread format text.

Turning to FIG. 5, more details of the logical flow which reformats the chain-forwarded message text into a discussion thread text format are is shown. First, the chain-forwarded text is parsed (50) into discussion entries. This may be done by finding common delimiters within the text of the chain-forwarded message, such as the number of special marking characters (e.g. ">", ">>", ">>>", etc.) from the left margin, or such a special HTML indicators, including horizontal bars and lines.

Then, the discussion entries are sorted (51) by time stamp or order of entry in the original message.

Next, all unnecessary fields and their data, such as the TO, REPLY_TO, and SUBJECT fields, and other information are removed (53) from the discussion entries.

According to the preferred embodiment, an address book is searched to find associated first names or nicknames for the originator's full addresses in the discussion entries, and those full addresses are replaced (53) with first names or nicknames from the address book. For example, the string "robert_smith@anycompany.com" may be replaced with "bob_s":

Finally, a discussion thread format of the message is created (54) by creating a text entries into the new electronic mail message in the order of discussion, and including only the first name, nickname, or other shortened name of the discussion entry originator. This yields a format such as shown in Table 7.

TABLE 7

Thread of Discussion Format bob_s: I'm not sure I understand who their competitors really are?
sue_m: Joe, that ought to take all the market share from ABC's biggest competitor!! I can't wait to see how this plays out.
joe_b: Sue, I heard that shares of company ABC hit all-time high after news of new product release. Company ABC announced that it's new XYZ product would ship by the end of the year, and would be 5 times more efficient that the closest competitor product.
sue_m: Joe, I was having lunch with Bob yesterday, and he said you had told him that you were getting ready to buy a lot of shares in ABC company. Is that right? I heard that their competitors had captured nearly 100% of the market share last year and ABC company might not survive the year.

In summary, methods for enhancing standard e-mail and electronic message readers and composers have been disclosed to allow realization of enhanced e-mail and electronic message readers and composers which provide automatic addressing and address book management functions for chain-forwarded messages, and for reformatting those chain-forwarded and chain-replied messages into a thread-of-dicussion format.

Certain details of the preferred embodiments have been disclosed, along with alternative approaches to realize the invention. It will be recognized by those skilled in the art that many alternatives from the disclosed preferred embodiment, such as the use of alternate programming methodologies or languages, alternate computing platforms, or alternate electronic message and e-mail standards, may be taken within the spirit and scope of the invention which is defined by the following claims.

What is claimed is:

1. A method for creating thread-of-discussion electronic mail messages for chained electronic mail messages in an electronic mail system, said method comprising the steps of:
   parsing text of the body of a single chained electronic mail message into discussion entries, said parsing being performed by finding delimiters and message segment indicators within the text of the chained electronic mail message which indicate the beginning and ending of two or more discussion entries wherein each discussion entry represents quoted text or content produced during a previously-performed message forward or message reply operation;
   sorting said discussion entries into a preferred order;
   reducing the discussion entries to discussion information by eliminating redundant and unnecessary information from said discussion entries; and
   outputting the sorted, reduced discussion entries into a single message having a thread-of-discussion message format.

2. The method as set forth in claim 1 wherein said step of parsing the text of a chained electronic mail message into discussion entries comprises parsing a Simple Mail Transfer Protocol message.

3. The method as set forth in claim 1 wherein said step of parsing the text of a chained electronic mail message into discussion entries comprises parsing a Hyper Text Markup Language message.

4. The method as set forth in claim 1 wherein said step of sorting said discussion entries into a preferred order comprises sorting the discussion entries into a first-to-last order based upon timestamps associated with the discussion entries.

5. The method as set forth in claim 1 wherein said step of sorting said discussion entries into a preferred order comprises sorting the discussion entries into a last-to-first order based upon timestamps associated with the discussion entries.

6. The method as set forth in claim 1 wherein said step of reducing the discussion entries to discussion information comprises removing extraneous non-discussion field and formatting information from the discussion entries.

7. The method as set forth in claim 1 wherein said step of outputting the sorted, reduced discussion entries into a thread-of-discussion message format further comprises replacing full electronic mail addresses for authors of said discussion entries with short names or abbreviations associated with the full electronic mail addresses.

8. The method as set forth in claim 1 further comprising a step of merging text from a chained electronic mail message with text from other chained electronic messages associated with a common chain group.

9. The method as set forth in claim 1 further comprising a step of automatically addressing a new electronic mail message to one or more of members of an associated chain group, said new electronic mail message containing said sorted, reduced discussion entries in a thread-of-dicussion format.

10. A computer-readable medium containing program code for creating thread-of-discussion electronic mail messages for chained electronic mail messages in an electronic mail system, said electronic mail system being capable of executing program code, said program code when executed causing the electronic mail system to perform the steps of:

parsing the text of the body of a single chained electronic mail message into discussion entries, said parsing being performed by finding delimiters and message segment indicators within the text of the chained electronic mail message which indicate the beginning and ending of two or more discussion entries wherein each discussion entry represents quoted text or content produced during a previously-performed message forward or message reply operation;

sorting said discussion entries into a preferred order;

reducing the discussion entries to discussion information by eliminating redundant and unnecessary information from said discussion entries; and outputting the sorted, reduced discussion entries into a single message having a thread-of-discussion message format.

11. The computer-readable medium as set forth in claim 10 wherein said program code for parsing the text of a chained electronic mail message into discussion entries comprises program code for parsing a Simple Mail Transfer Protocol message.

12. The computer-readable medium as set forth in claim 10 wherein said program code for parsing the text of a chained electronic mail message into discussion entries comprises program code for parsing a Hyper Text Markup Language message.

13. The computer-readable medium as set forth in claim 10 wherein said program code for sorting said discussion entries into a preferred order comprises program code for sorting the discussion entries into a first-to-last order based upon timestamps associated with the discussion entries.

14. The computer-readable medium as set forth in claim 10 wherein said program code for sorting said discussion entries into a preferred order comprises program code for sorting the discussion entries into a last-to-first order based upon timestamps associated with the discussion entries.

15. The computer-readable medium as set forth in claim 10 wherein said program code for reducing the discussion entries to discussion information comprises removing extraneous non-discussion field and formatting information from the discussion entries.

16. The computer-readable medium as set forth in claim 10 wherein said program code for outputting the sorted, reduced discussion entries into a thread-of-discussion message format further comprises program code for replacing full electronic mail addresses for authors of said discussion entries with short names or abbreviations associated with the full electronic mail addresses.

17. The computer-readable medium as set forth in claim 10 further comprising program code for performing the step of merging text from a chained electronic mail message with text from other chained electronic messages associated with a common chain group.

18. The computer-readable medium as set forth in claim 10 further comprising program code for step of automatically addressing a new electronic mail message to one or more of members of an associated chain group, said new electronic mail message containing said sorted, reduced discussion entries in a thread-of-dicussion format.

19. A system for producing thread-of-discussion formatted electronic messages for chained electronic messages in an electronic mail system, said electronic mail system having a processor suitable for executing program code, and said electronic mail system having a means for receiving chained-transmitted electronic messages via a computer network, said system comprising:

a message parser for parsing text in a body section of a single chained electronic message into discussion entries by finding delimiting indicators within the text of chained electronic message which indicate the beginning and ending of two or more discussion entries wherein each discussion entry represents quoted text or content produced during a previous-performed message forward or message reply operation;

an entry sorter for sorting discussion entries into a preferred order;

an information reducer for removing extraneous message information, data, and fields which are unrelated to substantive discussion; and a message output creator for creating a thread-of-discussion message containing said sorted and reduced discussion entries.

20. The system as set forth in claim 19 wherein said message parser is adapted to parse Simple Mail Transfer Protocol messages.

21. The system as set forth in claim 19 wherein said message parser is adapted to parse Hyper Text Markup Language messages.

22. The system as set forth in claim 19 wherein said entry sorter is adapted to sort discussion entries into a first-to-last order based upon timestamps associated with each discussion entry.

23. The system as set forth in claim 19 wherein said entry sorter is adapted to sort discussion entries into a last-to-first order based upon timestamps associated with each discussion entry.

24. The system as set forth in claim 19 wherein said message output creator further comprises a short name label creator for substituting full electronic mail addresses associated with said discussion entries with short names associated with said full electronic mail addresses.

25. The system as set forth in claim 19 wherein said message output creator further comprises a short name label creator for substituting full electronic mail addresses associated with said discussion entries with abbreviations of said full electronic mail addresses.

26. The system as set forth in claim 19 wherein said message parser is adapted to merge two or more chained electronic messages associated with a chain group.

27. The system as set forth in claim 19 wherein said message output creator further comprises and automatic message address generator for automatically addressing a new electronic message to one or more members of a chain group.

* * * * *